United States Patent

Sawyer

[11] Patent Number: 5,828,737
[45] Date of Patent: Oct. 27, 1998

[54] COMMUNICATIONS SERVICE BILLING BASED ON BANDWIDTH USE

[75] Inventor: Francois Sawyer, St-Hubert, Canada

[73] Assignee: Telefonaktiebolaget L M Ericsson, Stockholm

[21] Appl. No.: 547,543

[22] Filed: Oct. 24, 1995

[51] Int. Cl.⁶ .................................................. H04M 15/00
[52] U.S. Cl. ........................ 379/114; 370/546; 455/408
[58] Field of Search .................................. 379/111, 112, 379/113, 114–115, 121, 133, 134; 435/406, 408, 422, 450, 451, 452; 370/320, 389, 295, 441, 546

[56] References Cited

U.S. PATENT DOCUMENTS

| 4,358,844 | 11/1982 | Pirani . | |
|---|---|---|---|
| 4,365,327 | 12/1982 | Pirani . | |
| 5,065,393 | 11/1991 | Sibbitt et al. | 370/58.2 |
| 5,218,618 | 6/1993 | Sagey . | |
| 5,303,297 | 4/1994 | Hillis . | |
| 5,504,744 | 4/1996 | Adams et al. | 370/389 |
| 5,600,707 | 2/1997 | Miller, II | 455/422 |
| 5,608,446 | 3/1997 | Carr et al. | 348/6 |
| 5,629,938 | 5/1997 | Cerciello et al. | 370/384 |

FOREIGN PATENT DOCUMENTS

| 0506255 | 3/1992 | European Pat. Off. . |
|---|---|---|
| WO9524812 | 9/1995 | WIPO . |
| WO9527385 | 10/1995 | WIPO . |

OTHER PUBLICATIONS

*Network Design for a Fully Automatic Wide Area Radiotelephone Service*; M. Callendar and C. Donald, British Columbia Telephone Company, Vancouver, B.C., Canada; p. 245.

*Billing Users and Pricing for TCP*; IEEE Journal on Selected Areas in Communications 13 (1995) Sep., No. 7; New York, NY; pp. 62–75.

*Primary Examiner*—Paul Loomis
*Attorney, Agent, or Firm*—Jenkens & Gilchrist

[57] ABSTRACT

In a bandwidth-on-demand type communications system, like that provided with a code division multiple access (CDMA) cellular communications system, charging subscribers for calls based on communications length provides an inaccurate measure of communication cost, and further serves to discourage use of the system for data transmission applications. To provide a more accurate cost determination, the amount of bandwidth used by each communication is metered and multiplied by a charging rate. In particular, measurements of the maximum amount of bandwidth used during predetermined time intervals are made during the course of each communication, with the maximum bandwidth measurements being summed to determine an estimate of the total amount of bandwidth used during the communication. The charge for the communication is then determined by multiplying the estimated total bandwidth measurement by a charging rate multiplier.

9 Claims, 2 Drawing Sheets

COMMUNICATIONS SERVICE BILLING BASED ON BANDWIDTH USE

BACKGROUND OF THE INVENTION

1. Technical Field of the Invention

The present invention relates to bandwidth-on-demand type communications systems and, in particular, to a bandwidth-on-demand type cellular telephone system wherein subscribers are charged for use of the system based in part on the total amount of bandwidth used to carry the subscriber communication.

2. Description of Related Art

Conventional wire-line telephone service providers price telephone calls by taking into account a number of pricing structure parameters including call duration, call distance, time of day and day of the week. The generally fixed nature of the physical plant used to provide wire-line telephone service, coupled with the fact that calls are made from one known fixed geographic location to another, allows for the charges associated with providing the telephone service to be easily calculated and published.

The nature of the cellular telephone system, however, wherein system users have little or no geographical restrictions on the locations from which they may place or receive calls, makes the calculation of call charges more difficult. Rates vary based not only on some or all of the wire-line parameters mentioned above, but also on factors such as: which of several available cellular service providers carry the call; and whether the subscriber is roaming outside its own service area. The main variable in the charging formula in the conventional cellular system remains, however, the duration of the call.

In conventional analog and digital cellular telephone systems (like those provided with the Advanced Mobile Phone Service (AMPS or D-AMPS) or the Global System for Mobile (GSM) communications), a physical channel (or succession of channels in cases of hand-off) on the air interface are reserved to carry the call. The same amount of bandwidth is used on both the uplink and the downlink portions of the air interface connection throughout the duration of the call, even if the parties to the call are silent and no information is being carried. Duration based charging is therefore an appropriate measure of call cost: because once the channel is reserved and the connection is made, all of the available bandwidth on the reserved channel is then in use and is accordingly unavailable for use by others who desire cellular communications.

With the advent of the new bandwidth-on-demand type cellular telephone systems (like that provided in a code division multiple access (CDMA) or the like spread spectrum, bandwidth-on-demand type communications system), the communications are spread in a pseudo-random fashion throughout the radio frequency spectrum. A reservation of a physical channel is made throughout the duration of the call, but the amount of bandwidth used varies during the course of the call, with the amount of bandwidth utilized being related in part to the amount of data sent and received. In fact, the uplink and the downlink bandwidth needed for the call often times differ from each other. Duration based charging is therefore an inappropriate measure of the cost of the call because relatively little bandwidth is needed to maintain the connection during times of silence, with the unused bandwidth being immediately available for use by others who desire cellular communications.

There is accordingly a need for a more accurate charging measure to be applied to bandwidth-on-demand type communications systems. In this regard, the amount of bandwidth used, rather than or in addition to the duration of the communication itself, should be a key factor in the charging determination.

SUMMARY OF THE INVENTION

The amount of bandwidth used during the course of communications carried by a bandwidth-on-demand type communications system is metered and multiplied by a charging rate to determine the charges incurred for the communication. In particular, periodic instantaneous bandwidth use measurements are made during the course of each communication. The periodically made bandwidth use measurements are summed to determine an estimate of the total amount of bandwidth used to carry the communication. A charging rate multiplier is then applied to the determined total bandwidth to obtain the charge incurred for the communication.

The present invention is applicable to any bandwidth-on-demand type communications system, including spread spectrum communications systems of the code division multiple access (CDMA) type, and is particularly useful in CDMA or the like cellular telephone systems. Instantaneous measurements are made of the bandwidth used on a bandwidth-on-demand communications link or air interface and summed to derive an estimate of the total amount of bandwidth used for the communication. The charge incurred for that communication is then determined by multiplying the total amount of bandwidth used by a charging rate multiplier.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
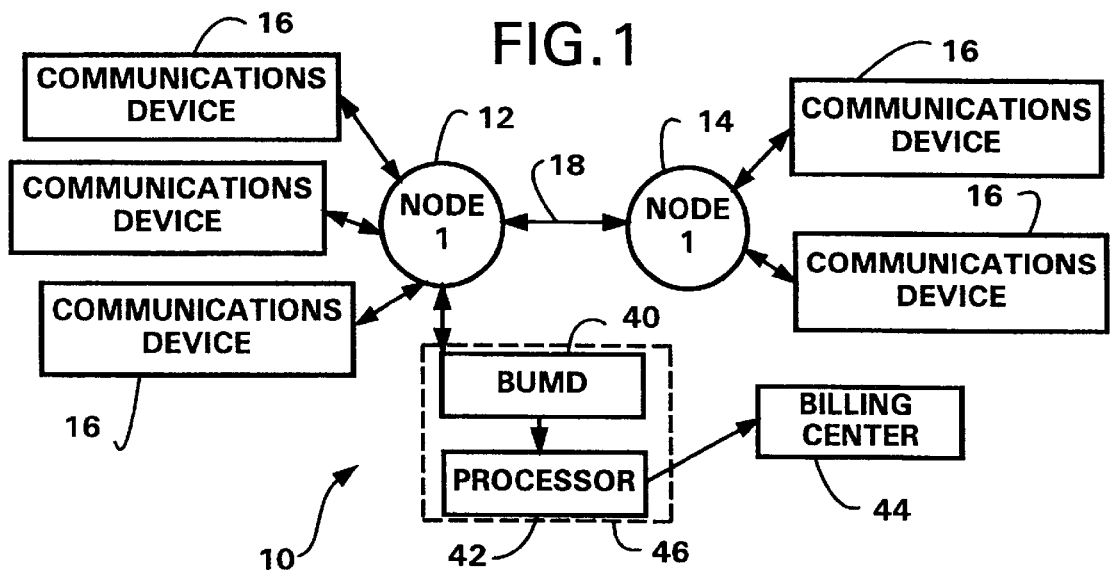
FIG. 1 is a block diagram of a bandwidth-on-demand type communications system.

Reference is now made to FIG. 1 wherein there is shown a block diagram of a bandwidth-on-demand type communications system 10 including at least a first node 12 and a second node 14. Connected to each of the nodes 12 and 14 are a plurality of communications devices 16. The first and second nodes 12 and 14 are interconnected by a communications link 18 facilitating simultaneous plural communications between any of the communications devices 16 via the nodes and over the communications link.

Figure 2:
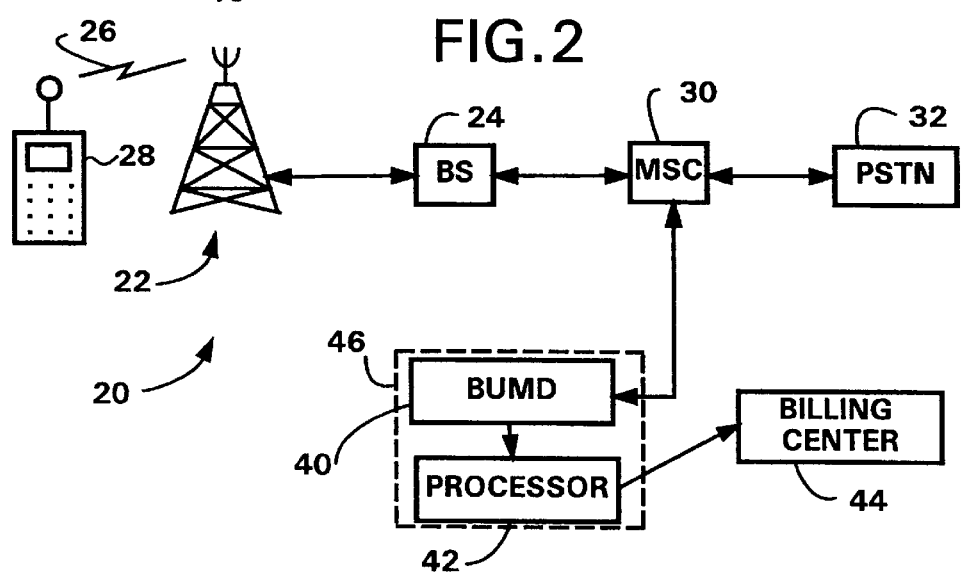
FIG. 2 is a block diagram of a bandwidth-on-demand type cellular telephone system.

Reference is now made to FIG. 2 wherein there is shown a block diagram of a bandwidth-on-demand type cellular telephone system 20 including a single cell site 22. It will, of course, be understood that such a system 20 would typically include a plurality of cell sites 22, and that the depiction of a single cell site is to be taken as an illustration of, rather than a limitation on, the operation of the present invention. Each cell site 22 includes a base station (BS) 24 for effectuating bidirectional radio frequency communications over a radio frequency air interface 26 with mobile stations 28 operating within the system 20. It will further be understood that cellular telephone systems like the system 20 typically include far more than one mobile station 28 operating within the system 20, or any one cell site 22 therein, at any one time. The depiction of only one mobile station 28 then is to be taken as an illustration of, rather than a limitation on, the operation of the present invention. Each base station 24 is connected to a mobile switching center (MSC) 30 that is connected to the public switched telephone network (PSTN) 32 or other telephone network (not shown). The mobile switching center 30 operates to control base station 24 operation, maintain a record of mobile station location within the system 20 and switch, with the public switched telephone network 32, those cellular telephone calls originated by or terminated at the mobile stations 28.

The communications link 18 and air interface 26 have a "connection-less" communications orientation. By "connection-less" it is meant that the communications link 18 and air interface 26 offer bandwidth-on-demand for simultaneous communications. In the context of the communications link 18, packets of information originated at one of the communications devices 16 are transmitted between the first and second nodes 12 and 14, respectively, without using a fixed amount of communications resource. Similarly, in the context of the air interface 26, packets of information are transmitted between each mobile station 28 and the base station 24 without using a fixed amount of the communications resource. The communications link 18 or air interface 26 may accordingly comprise a spread spectrum communications link of the type provided through the use of a code division multiple access (CDMA) communications protocol.

Figure 3A:
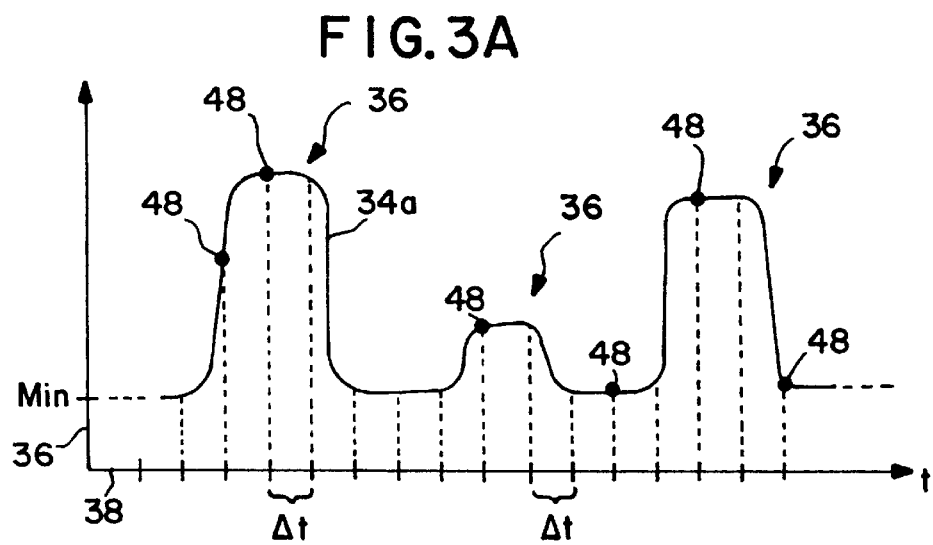
FIG. 3A is a graph illustrating the bandwidth used in a forward or downlink direction for a portion of a typical communication on the systems of FIGS. 1 and 2.
Figure 3B:
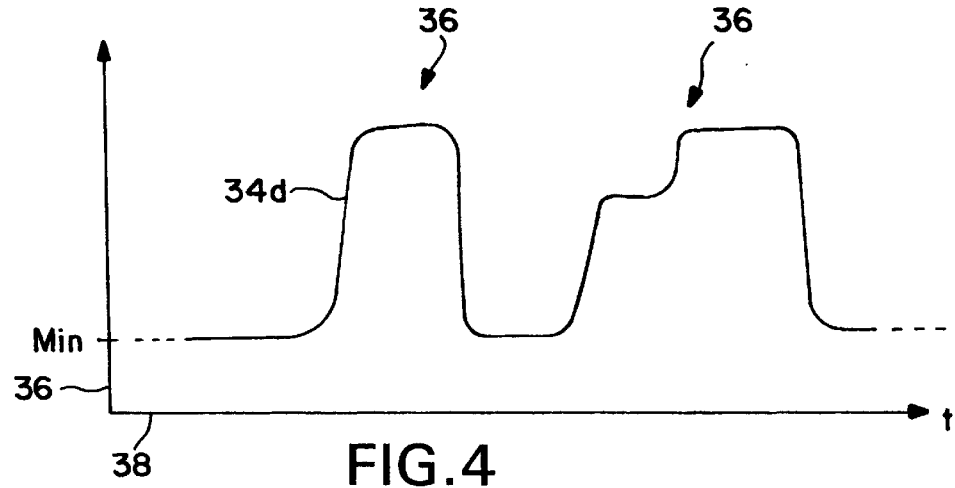
FIG. 3B is a graph illustrating the bandwidth used in a reverse or uplink direction for a portion of a typical communication on the systems of FIGS. 1 and 2.

Referring now also to FIGS. 3A and 3B, there are shown graphs illustrating the on-demand use of available bandwidth on either the communications link 18 or the air interface 26 during a portion of a single bi-directional communication or cellular telephone call. For each of the graphs, the bandwidth used 34 on the communications link 18 or air interface 26 is plotted against the y-axis 36, while time over the displayed portion of the duration of the communication or call is plotted against the x-axis 38. In FIG. 3A, the bandwidth used 34$u$ is presented with respect to the reverse or uplink portion of the communication or call over the communications link 18 (from the first node 12 to the second node 14) or the air interface 26 (from the mobile station 28 to the base station 24). FIG. 3B, on the other hand, presents the bandwidth used 34$d$ with respect to the forward or downlink portion of the communication or call over the communications link 18 (from the second node 14 to the first node 12) or the air interface 26 (from the base station 24 to the mobile station 28).

It will be noticed from a review of FIGS. 3A and 3B that the bandwidth used 34$u$ and 34$d$ varies considerably over the course of the communication or call. The momentary increases in bandwidth used 34$u$ and 34$d$ identify instances wherein packet transmissions 36 are made over the communications link 18 or the air interface 26. In this connection, it should be noted that the packet transmissions may comprise either voice or data communications. The minimum bandwidth level (Min) identifies the minimum amount of bandwidth needed (i.e., that must be used) in order to maintain the connection-less communication over the bandwidth-on-demand communications link 18 or air interface 26 in between instances of successive packet transmissions 36. That minimum amount of bandwidth is used for the transmission of command messages, such as power control orders and messages supporting mobile assisted hand-off.

Charging users for access to and the use of the communications link 18 of the communications system of FIG. 1 or the air interface 26 of the cellular telephone system of FIG. 2 is an important concern for the communications services provider. This charging aspect is the primary means by which revenue is generated for the service provider. The conventional method of using the duration of the communication or call as the primary factor in determining the charge to be billed is not a particularly accurate method for use in bandwidth-on-demand type communications systems. The reason for this is that no fixed amount of communications resource is used to the exclusion of use of that resource by others. Rather, as indicated in FIGS. 3A and 3B, available bandwidth is used by the communication or call to a significant degree only when packet transmissions 36 are sent over the communications link 18 or the air interface 26. At all other times with respect to the illustrated communication, a small amount of bandwidth (identified by the minimum bandwidth level (Min)) is used to maintain the connection in place, thus limiting to some degree others from simultaneously accessing the system and using an available part of the bandwidth due to a reduction in communications capacity. Duration based charging further acts as a disincentive to use of the systems 10 and 20 for data applications because the connections are typically long term, expensive connections with periodic, brief data transmissions.

One solution to this charging concern is to charge the user based on the amount of packets of information in all of the packet transmissions 36 transmitted over the course of the communication. The use of packet amounts as the primary factor in determining the charge to be billed is also not particularly accurate in bandwidth-on-demand type communications systems because a user would be charged the same amount for a ten kilobyte packet transmission regardless of the length of the communication. This charging scheme accordingly does not take into account the minimum level (Min) of bandwidth used in maintaining the communication over the communications link 18 or the air interface 26 in between instances of successive packet transmissions 36. Even though minimal in nature, use of that minimum amount of bandwidth affects the capability (i.e., capacity) of the system to simultaneously handle other communications and thus should be reflected in the charge billed to the user for making the communication or call.

Reference is now again made to FIG. 1. The communications system 10 further includes a bandwidth use monitoring device (BUMD) 40 connected to either one or both of the nodes 12 and 14 and operable to make measurements for each communication carried over the communications link 18 of the instantaneous amount of bandwidth being used by the communication. The measurements may be made by the device 40 on either or both the reverse and/or the forward portions of the communications link 18. The results of these measurements are output to a processing device 42 associated with a billing center 44 for the system 10 that sums the bandwidth use measurements to derive an estimate of the total bandwidth usage amount for each communication. The bandwidth use monitoring device 40 and processing device 42 accordingly function as a bandwidth meter 46 measuring the total amount of bandwidth used for each communication. The processing device 42 then further functions to multiply the derived total bandwidth usage amounts by a charging rate to determine a charging amount to be billed for each communication, with the determined charging amount reported to the billing center 44 for the addition of other charge items and the generation of a bill to the user.

The cellular telephone system 20 of FIG. 2 includes a similar functionality for determining a charging amount to be billed for each cellular telephone call. The mobile switching center 30 includes or is connected to a bandwidth use monitoring device 40 operable to make measurements, for each call carried over the air interface 26, of the instantaneous amount of bandwidth being used for the call. These measurements may be made by the device 40 on either or both the uplink and/or the downlink portions of the air interface 26. The results of these periodically made, instantaneous measurements are output to a processing device 42 associated with a billing center 44 for the cellular system 20 that sums the bandwidth use measurements to derive an estimate of the total bandwidth usage amount for each call. The bandwidth use monitoring device 40 and processing device 42 accordingly function as a bandwidth meter 46 measuring the total amount of bandwidth used for each call. The processing device 42 then further functions to multiply the derived total bandwidth usage amounts by a charging rate to determine a charging amount to be billed for each communication, with the determined charging amount reported to the billing center 44 for the addition of other charge items and the generation of a bill to the subscriber.

The operation of the bandwidth use monitoring device 40 and processing device 42 as a bandwidth meter 46 to determine the total amount of bandwidth being used for each communication or call carried over the communications link 18 or air interface 26, respectively, may be better understood by referring again to FIG. 3A. The bandwidth use monitoring device 40 operates to make instantaneous bandwidth use measurements, with the measurements reported to the processing device 42. The processing device 42 is programmed with a predetermined time interval $\Delta t$, and operates to determine (from the reported instantaneous measurements) the maximum amount 48 of bandwidth used during each time interval by each communication or call carried over the communications link 18 or air interface 26, respectively. The size of the predetermined time interval $\Delta t$ determines the number of device 40 made instantaneous bandwidth use measurements considered in making the determination of the maximum amount 48 of bandwidth used during the time interval. The measured maximum amounts 48 of bandwidth are then summed by the processing device 42 over the course of the communication or call to derive an estimate of the total bandwidth usage amount. Multiplication of this total amount of bandwidth usage by a charging rate gives the charging amount to be billed by the billing center 44 to the user for its use of the communication link 18 or air interface 26.

The processing device 42 determined charging amount may not necessarily comprise the total charging amount billed to the user for the communication or call. For example, in the communications system 10 of FIG. 1, the user may further be charged either a flat fee or a time based fee for usage of one of the communications devices 16 during the course of the communication. Such a charge might arise in situations where the communications device 16 used comprises a data service node (like a database), and the user is charged not only for the connection made over the communications link 18 to the device, but also for use of the device itself. Similarly, in the cellular telephone system 20 of FIG. 2, the user may further be charged a premium for being a roamer, and may also be charged a time based fee for usage of the public switched telephone network 32 (for example, if a long distance call was involved). The additional charges are added to the determined charging amount by the billing center 44 to provide a total charge for the communication or call.

Figure 4:
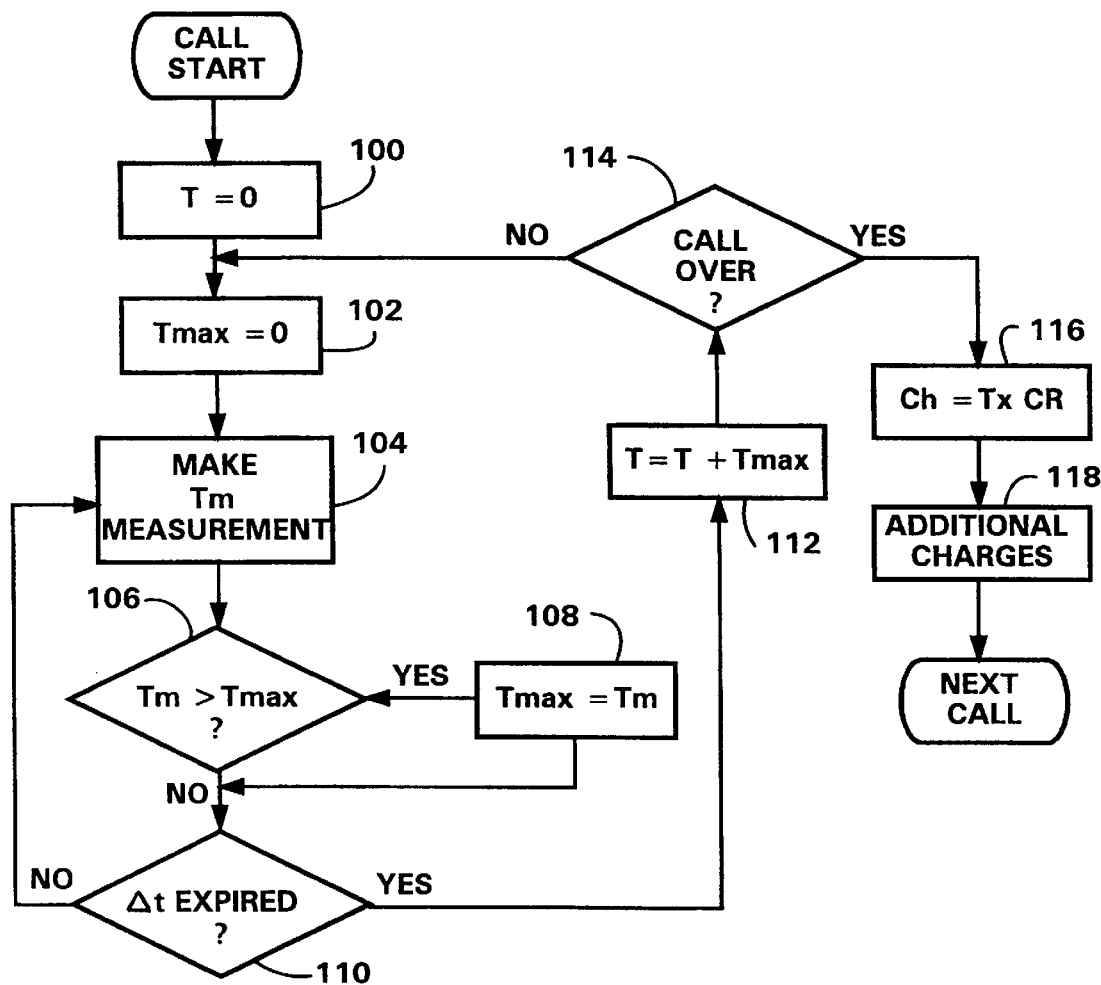
FIG. 4 is a flow diagram illustrating the operation of the present invention.

Reference is now made to FIG. 4 wherein there is shown a flow diagram illustrating one method of operating the bandwidth use monitoring device 40 and the processing device 42 as a bandwidth meter 46 to determine a charging amount to be billed for a single communication or call in the systems 10 and 20 of FIGS. 1 and 2. In step 100, the total bandwidth usage amount (T) is set equal to zero at the beginning of the communication or call. In steps 102–110, the communications link 18 or air interface 26 is monitored by the bandwidth use monitoring device 40 and processing device 42 to measure instantaneous bandwidth usage and determine the maximum interval bandwidth used by the communication or call during each of the predetermined time intervals $\Delta t$. In particular, in step 102 the maximum interval bandwidth (Tmax) is set equal to zero. An instantaneous measurement of the amount of bandwidth (Tm) being used for the communication or call is then made in step 104. A determination is then made in step 106 as to whether measured instantaneous bandwidth (Tm) is greater than the current maximum interval bandwidth (Tmax) value. If yes, the current maximum bandwidth (Tmax) value is set equal to the measured instantaneous bandwidth (Tm) in step 108. If no, step 108 is skipped. A determination is then made in step 110 as to whether the predetermined time interval $\Delta t$ has expired. If not, the process returns to step 104 to make another instantaneous measurement of the amount of bandwidth (Tm) being used for the communication or call, and then perhaps update the determination of the maximum interval bandwidth used (Tmax). The length of the time interval $\Delta t$ determines the number of instantaneous measurements considered in determining the maximum interval bandwidth used in each time interval.

Once the predetermined time interval $\Delta t$ expires and the maximum interval bandwidth used (Tmax) by the communication or call is determined in the manner described above for steps 102–110, the total bandwidth (T) used for the communication or call is updated in step 112 and set equal to the previous total (T) up to the last time interval plus the maximum interval bandwidth (Tmax) used during the current time interval. A determination is then made in step 114 as to whether the communication or call being monitored has terminated. If no, the process returns to steps 102–110 to monitor the communications link 18 or air interface 26, to measure instantaneous bandwidth usage, and to determine the maximum interval bandwidth used by the communication or call during a next one of the predetermined time intervals $\Delta t$ for addition (in step 112) to the previously calculated summed total bandwidth (T). If yes, a calculation of the charge (Ch) for the communication or call is then made in step 116 by multiplying the total bandwidth (T) determined in step 112 by a charging rate (CR). In step 118, any additional charges for the communication or call are added to the charge (Ch) to give a total charge for the communication or call.

It should be noted that the method illustrated in FIG. 4 could be simplified if the chosen value for $\Delta t$ were small enough (i.e., having a frequency of more than twice the maximum rate of change of the bandwidth used), then steps 102, 106, 108 and 110 would not be needed. The preferred embodiment of the invention includes these steps, however, to reduce the load on the processor 42 and its associated data storage elements (not shown).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a cellular telephone system having a bandwidth-on-demand air interface carrying communication command messages and packet transmissions, and using a minimum bandwidth for maintaining a subscriber communication, a method for determining a charge incurred for use of the air interface bandwidth to carry the subscriber communication, comprising the steps of:

estimating a total amount of air interface bandwidth used over the course of the subscriber communication; and multiplying the estimated total amount of bandwidth used by a charging rate to identify the charge incurred for the subscriber communication.

2. The method as in claim 1 wherein the step of estimating the total amount of bandwidth used comprises the steps of:

measuring a maximum amount of bandwidth used on the air interface for the subscriber communication during each of a plurality of time intervals measured over the course of the subscriber communication; and summing the measured maximum amounts of bandwidth to determine the estimated total amount of bandwidth used by the subscriber communication.

3. The method as in claim 2 wherein the step of measuring comprises the steps of:

making instantaneous measurements of the bandwidth used during each time interval; and selecting a largest one of the measurements as the maximum amount of bandwidth used during the time interval.

4. The method as in claim 1 wherein the bandwidth-on-demand type air interface operates in accordance with a code division multiple access (CDMA) communications air interface.

5. The method as in claim 1 wherein the step of estimating comprises the step of metering the use of air interface bandwidth by the subscriber communication.

6. A cellular telephone system, comprising:

a base station;

a plurality of subscriber mobile stations;

a bandwidth-on-demand air interface interconnecting The plurality of subscriber mobile stations with the base station to simultaneously carry a plurality of subscriber communications between the mobile stations and the base station, the bandwidth-on-demand air interface carrying communication command messages and packet transmissions and using a minimum bandwidth for maintaining a subscriber communication; and means for determining a charge incurred for use of the air interface bandwidth by each of the subscriber communications, the charge incurred being calculated based on an estimation of a total amount of bandwidth used by each subscriber communication.

7. The system of claim 6 wherein the means for determining comprises:

means for making instantaneous measurements of bandwidth used over the course of each subscriber communication;

means for summing the periodic bandwidth measurements to determine an estimate of the total amount of bandwidth used for each subscriber communication; and means for multiplying each of the determined total amounts of bandwidth used by a charging rate to determine the charges incurred for use of the communications link by each subscriber communication.

8. The system of claim 6 wherein the bandwidth-on-demand air interface operates in accordance with a code division multiple access (CDMA) communications air interface.

9. The system of claim 6 wherein the means for determining comprises:

a bandwidth meter for measuring the total amount of bandwidth used for each subscriber communication; and means for multiplying the metered amount of bandwidth for each subscriber communication by a charging rate.

* * * * *